United States Patent
Spangler et al.

(10) Patent No.: US 11,952,911 B2
(45) Date of Patent: Apr. 9, 2024

(54) AIRFOIL WITH CONNECTING RIB

(71) Applicant: United Technologies Corporation, Farmington, CT (US)

(72) Inventors: Brandon W. Spangler, Vernon, CT (US); David R. Pack, Ellington, CT (US); JinQuan Xu, East Greenwich, RI (US)

(73) Assignee: RTX CORPORATION, Farmington, CT (US)

( * ) Notice: Subject to any disclaimer, the term of this patent is extended or adjusted under 35 U.S.C. 154(b) by 610 days.

(21) Appl. No.: 16/683,640

(22) Filed: Nov. 14, 2019

(65) Prior Publication Data

US 2021/0148235 A1 May 20, 2021

(51) Int. Cl.
*F01D 5/18* (2006.01)

(52) U.S. Cl.
CPC ............ *F01D 5/18* (2013.01); *F05D 2220/32* (2013.01); *F05D 2240/304* (2013.01); *F05D 2260/22141* (2013.01)

(58) Field of Classification Search
CPC .... F01D 5/147; F01D 5/18; F01D 5/186–189; F01D 25/12; F05D 2220/32; F05D 2240/304; F05D 2260/202; F05D 2260/22141
USPC ...................................................... 416/96 R
See application file for complete search history.

(56) References Cited

U.S. PATENT DOCUMENTS

| | | | | |
|---|---|---|---|---|
| 3,191,908 A * | 6/1965 | Petrie | ...................... | F01D 5/187 416/96 R |
| 5,156,526 A * | 10/1992 | Lee | ......................... | F01D 5/187 416/97 R |
| 5,387,085 A * | 2/1995 | Thomas, Jr. | ............ | F01D 5/187 415/115 |
| 5,931,638 A * | 8/1999 | Krause | ..................... | F01D 5/186 416/97 R |
| 6,283,708 B1 * | 9/2001 | Zelesky | ................... | F01D 5/189 416/97 R |
| 7,556,476 B1 | 7/2009 | Liang | | |
| 9,551,228 B2 | 1/2017 | Propheter-Hinckley et al. | | |
| 9,850,763 B2 * | 12/2017 | Itzel | ........................ | F01D 9/041 |
| 10,024,171 B2 | 7/2018 | Itzel | | |
| 10,156,143 B2 | 12/2018 | Fisk | | |
| 10,494,931 B2 | 12/2019 | Landrum et al. | | |
| 2003/0133797 A1 * | 7/2003 | Dailey | .................... | F01D 5/187 416/97 R |

(Continued)

FOREIGN PATENT DOCUMENTS

| | | |
|---|---|---|
| EP | 1607577 | 12/2005 |
| EP | 2107215 | 10/2009 |

(Continued)

OTHER PUBLICATIONS

European Search Report for European Patent Application No. 20207211.2 completed Jan. 22, 2021.

*Primary Examiner* — Justin A Pruitt

(74) *Attorney, Agent, or Firm* — Carlson, Gaskey & Olds, P.C.

(57) ABSTRACT

An airfoil include an airfoil wall that defines a leading end, a trailing end, a first side wall, and a second side wall. A rib connects the first and second side walls of the airfoil wall. The rib includes a first arm by which the rib is solely connected to the first side wall, and second and third arms by which the rib is solely connected to the second side wall.

22 Claims, 5 Drawing Sheets

(56) References Cited

U.S. PATENT DOCUMENTS

| | | | |
|---|---|---|---|
| 2004/0076519 A1* | 4/2004 | Halfmann | B22C 9/103 |
| | | | 416/97 R |
| 2016/0319674 A1* | 11/2016 | Gleiner | B22D 15/00 |
| 2017/0101893 A1* | 4/2017 | Marsh | F01D 5/18 |
| 2018/0320529 A1* | 11/2018 | Quach | F01D 5/186 |
| 2019/0024515 A1 | 1/2019 | Marsh et al. | |
| 2019/0093487 A1 | 3/2019 | Marsh et al. | |

FOREIGN PATENT DOCUMENTS

| | | |
|---|---|---|
| EP | 3399148 | 11/2018 |
| EP | 3511523 | 7/2019 |
| EP | 3734015 | 11/2020 |

* cited by examiner

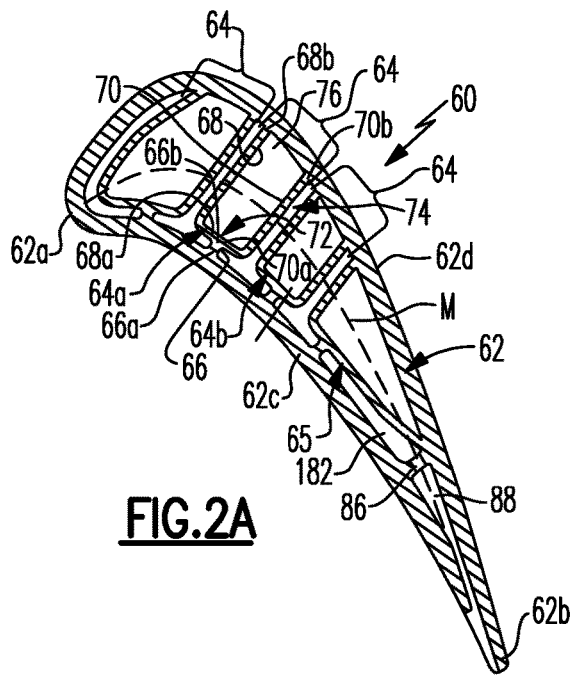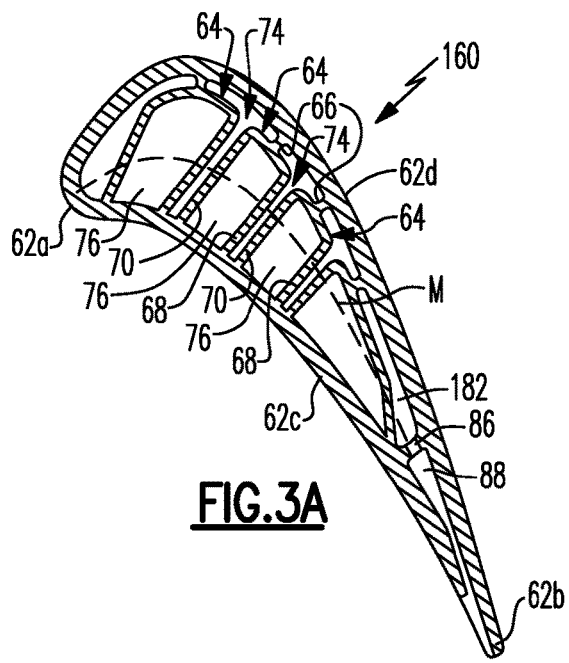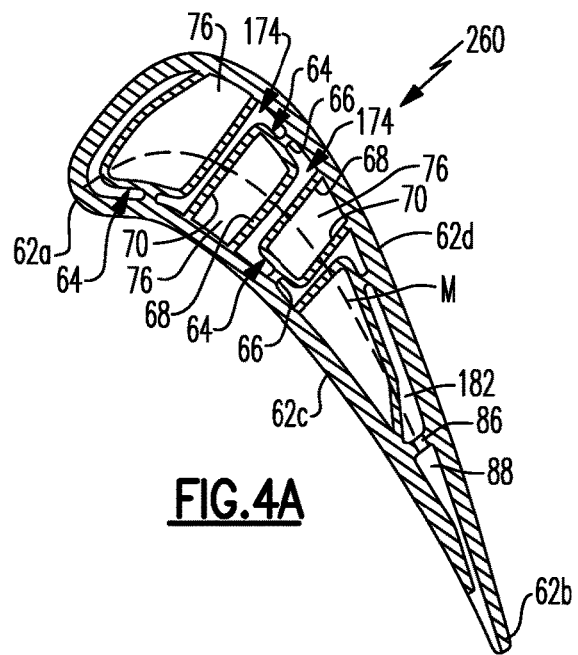

AIRFOIL WITH CONNECTING RIB

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil wall that defines a leading end, a trailing end, a first side wall, and a second side wall. A rib connects the first and second side walls of the airfoil wall. The rib includes a first arm by which the rib is solely connected to the first side wall, and second and third arms by which the rib is solely connected to the second side wall.

In a further embodiment of any of the foregoing embodiments, the first arm, the second arm, and the third arm each include a first end and a second end, and the rib includes the first end of the first arm attached to the first side wall. The second end of the first arm is attached at a node to the respective first ends of the second and third arms, and the second ends of the second and third arms are attached to the second side wall.

In a further embodiment of any of the foregoing embodiments, the node is closer to the first side wall than to the second side wall.

In a further embodiment of any of the foregoing embodiments, the first side wall is a pressure side wall and the second side wall is a suction side wall.

In a further embodiment of any of the foregoing embodiments, the second and third arms and the second side wall bound a rib passage.

In a further embodiment of any of the foregoing embodiments, the first, second, and third arms include cooling apertures.

In a further embodiment of any of the foregoing embodiments, the second side wall includes a cooling passage embedded between inner and outer portions of the second side wall.

In a further embodiment of any of the foregoing embodiments, the second and third arms and the second side wall bound a rib passage, and the cooling passage is offset from the rib passage.

A further embodiment of any of the foregoing embodiments includes a cross arm connecting the second and third arms.

Also disclosed is an investment casting core that has a T-shape or a Z-shape which is configured to form the rib of any of the foregoing embodiments.

An airfoil according to an example of the present disclosure includes an airfoil wall that defines a leading end, a trailing end, a first side wall, and a second side wall. First and second ribs each connect the first and second side walls of the airfoil wall. Each of the first and second ribs have a first arm by which the respective first or second rib is solely joined to one of the first or second side walls, and second and third arms by which the respective first or second rib is solely connected to the other of the first or second side wall.

In a further embodiment of any of the foregoing embodiments, the first arm, the second arm, and the third arm each include a first end and a second end, and the first and second ribs include the first end of the first arm attached to the first or second side wall. The second end of the first arm is attached at a node to the respective first ends of the second and third arms, and the second ends of the second and third arms are attached to the other of the first or second side wall.

In a further embodiment of any of the foregoing embodiments, the first arm of the first rib is connected to the first side wall and the second and third arms of the first rib are connected to the second side wall, and the first arm of the second rib is connected to the second side wall and the second and third arms of the second rib are connected to the first side wall.

In a further embodiment of any of the foregoing embodiments, the node of the first rib is closer to the first side wall than to the second side wall, and the node of the second rib is closer to the second side wall.

In a further embodiment of any of the foregoing embodiments, the first arm of the first rib is connected to the first side wall and the second and third arms of the first rib are connected to the second side wall, and the first arm of the second rib is connected to the first side wall and the second and third arms of the second rib are connected to the second side wall.

In a further embodiment of any of the foregoing embodiments, the nodes of the first and second ribs are both closer to the first side wall than to the second side wall.

In a further embodiment of any of the foregoing embodiments, the first and second ribs and the first and second side walls bound a cooling passage there between.

In a further embodiment of any of the foregoing embodiments, at least one of the first or second side walls includes a cooling passage embedded between inner and outer portions of the one of the first or second side walls.

In a further embodiment of any of the foregoing embodiments, the second and third arms and the second side wall bound a rib passage, and the cooling passage is axially offset from the rib passage.

In a further embodiment of any of the foregoing embodiments, the airfoil wall includes a trailing end passage and an internal aperture connecting the cooling passage to the trailing end passage.

A gas turbine engine according to an example of the present disclosure includes a compressor section, a combustor in fluid communication with the compressor section, and a turbine section in fluid communication with the combustor. The turbine section has an airfoil that includes an airfoil wall that defines a leading end, a trailing end, a first side wall, and a second side wall. First and second ribs each connect the first and second side walls of the airfoil wall. Each of the first and second ribs have a first arm by which the respective first or second rib is solely joined to one of the first or second side walls, and second and third arms by which the respective first or second rib is solely connected to the other of the first or second side wall.

In a further embodiment of any of the foregoing embodiments, the first arm, the second arm, and the third arm each include a first end and a second end, and the rib includes the first end of the first arm attached to the first side wall. The second end of the first arm is attached at a node to the respective first ends of the second and third arms. The second ends of the second and third arms are attached to the second side wall, and the node is closer to the first side wall than to the second side wall.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2A illustrates an airfoil of the gas turbine engine.

FIG. 3A illustrates another example airfoil with a reversed rib orientation.

FIG. 4A illustrates another example airfoil with an alternating rib configuration.

DETAILED DESCRIPTION

Figure 1:
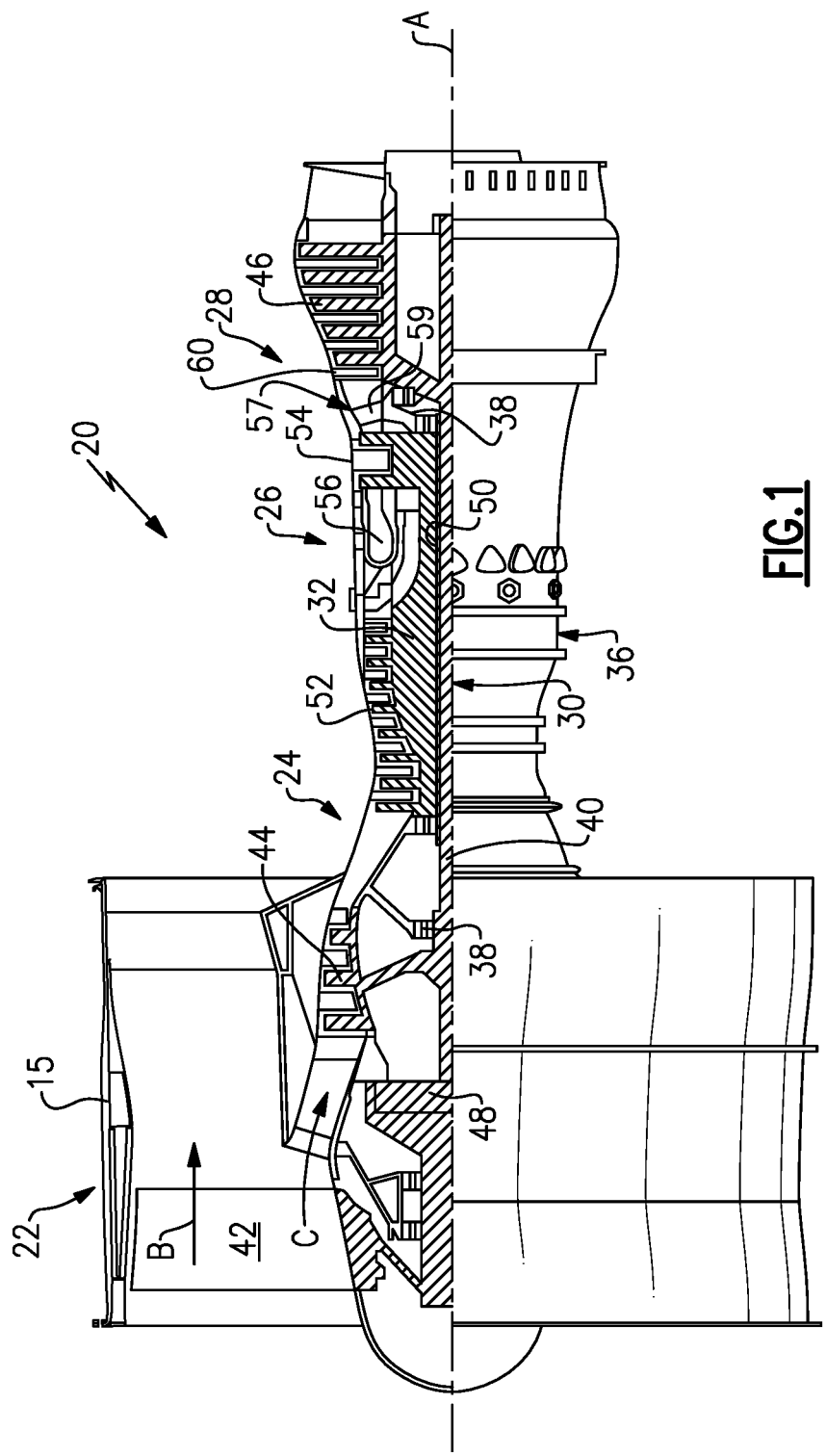
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

FIG. 2A shows a representation of a sectioned airfoil 60 used in the turbine engine 20 (see also FIG. 1). The airfoil 60 is a turbine blade; however, it is to be understood that this disclosure is also applicable to cooled blades or vanes.

The airfoil 60 includes an (outer) airfoil wall 62 that spans in a radial direction and delimits the aerodynamic profile of the airfoil 60. In this regard, the wall 62 defines a leading end 62*a*, a trailing end 62*b*, and first and second side walls 62*c*/62*d* that join the leading end 62*a* and the trailing end 62*b*. In this example, the first side 62*c* is a pressure side and the second side 62*d* is a suction side. A mean line (M) extends from the leading end 62*a* to the trailing end 62*b*. All locations on the mean line (M) are equidistant from the first and second side walls 62*c*/62*d* (in a perpendicular direction to the mean line at the location). For purposes of this disclosure, elements, regions, or portions thereof that are below the mean line (M) in FIG. 2 are considered to be on the pressure side, and elements, regions, or portions thereof that are above the mean line (M) in FIG. 2 are considered to be on the suction side.

The airfoil 60 further includes one or more ribs 64. In the illustrated example, the airfoil has three such ribs 64, although the airfoil 60 in modified examples can include a single rib 64, two ribs 64, or more than three ribs 64. And although a single rib 64 is described in some instances herein, it is to be understood that each such rib 64 has the described attributes of the single rib 64.

Of the three ribs 64 depicted, one is adjacent the leading end 62*a*, followed by two intermediate ribs 64, followed by a final rib 65 adjacent the trailing end 62*b*. For purposes of describing the attributes and functions of the ribs 64, the first of the intermediate ribs 64 (adjacent the leading end rib 64) will be considered a first rib 64*a* and the next intermediate rib 64 will be considered a second rib 64*b*. The terminology "first" and "second" is to differentiate that there are two distinct ribs. It is to be understood that the terms "first" and "second" are interchangeable and that the first rib could alternatively be termed as the second rib and that the second rib could alternatively be termed as the first rib, provided the ribs are adjacent one another. If the airfoil 60 includes additional ribs 64, any two adjacent ribs 64 are considered first and second ribs.

Each rib 64 connects the first and second sides 62*c*/62*d* of the airfoil wall 62. Each rib 64 is generally longitudinally elongated between an inner diameter and outer diameter such that it spans the full or substantially full longitudinal distance of the airfoil wall 62. The term substantially full refers to at least 70% of the longitudinal distance between the inner diameter and outer diameter.

Each rib 64 includes a first arm 66 by which the rib 64 is solely connected to the first or second side wall 62*c*, and second and third arms 68/70 by which the rib 64 is solely connected to the other of the first or second side wall 62*d*. Exclusive of any cooling apertures, each arm 66/68/70 is a solid, continuous wall. In general, except for a later example of a cross arm, the arms 66/68/70 do not have any structural appendages.

In the illustrated example, the first arm 66 is attached to the first side wall 62*c* and the second and third arms 68/70 are attached to the second side wall 62*d*. In later examples, the attachments of some or all of the ribs 64 are reversed and the first arm 66 is attached to the second side wall 62*d* and the second and third arms 68/70 are attached to the first side wall 62*c*. As used herein, the phrase "solely connected" or variations thereof refers to the arm or arms being the exclusive structural attachment(s) of the rib 64 to the first side wall 62*c* or second side wall 62*d*, without any intermediate structures in between the attachments.

The first arm 66 has first and second ends 66*a*/66*b*. The second and third arms 68/70 likewise have respective first ends 68*a*/70*a* and second ends 68*b*/70*b*. In this example, the first end 68*a* of the first arm 66 is attached to the first side wall 62*c*, the second end 68*b* of the first arm 68 is attached at a node 72 to the respective first ends 68*a*/70*a* of the second and third arms 68/70, and the respective second ends 68*b*/70*b* of the second and third arms 68/70 are attached to the second side wall 62*d*.

Except for connection through the arms 66/68/70 to the airfoil wall 62, the ribs 64 are disjoined from each other. As used herein, the term "disjoined" refers to the ribs 64 excluding any structural attachments to each other. Such an attachment configuration permits each rib 64 to reinforce the side walls 62*c*/62*d* and facilitate reduction in bulging from internal pressure, while still permitting the ribs 64 to move and thermally expand and contract at a different rate than the side walls 62*c*/62*d* during thermal cycling and without interference from adjacent ribs 64.

The ribs 64 partition the interior cavity of the airfoil 60 such that the airfoil wall 62 and the first and second ribs 64*a*/64*b* bound a continuous cooling channel 74 therebetween. The cooling channel 74 is continuous in that it spans the adjacent first and second ribs 64*a*/64*b* and side walls 62*c*/62*d* without any partitions. Similarly, the second and third arms 68/70 and second side wall 62*d* bound a rib passage 76.

In the illustrated example, relative to the mean line (M), the node 72 is located toward the first side wall 62*c* and is thus closer in distance to the first side wall 62*c* than to the second side wall 62*d*. In reverse orientations of the rib 64, the node 72 is closer to the second side wall 62*d* than to the first side wall 62*c*. In additional examples, of the distance from the first side wall 62*c* to the mean line (M), the node 72 is located in the initial 50% of the distance from the first side wall 62*c* (or alternatively the second side wall 62*d*), or in the initial 25% of the distance from the first side wall 62*c* (or alternatively the second side wall 62*d*). The relatively close proximity of the node 72 to the first side wall 62*c* (or alternatively to the second side wall 62*d*) serves to create a relatively narrow leg of the cooling channel 74 along the first side wall 62*c* (or alternatively along the second side wall 62*d*). Thus, cooling air in the cooling channel 74 serves to cool a relatively long extent of the first side wall 62*c* (or alternatively the second side wall 62*d*), which will be further appreciated from the description below.

Cooling air, such as bleed air from the compressor section 24 of the engine 20, is provided to the cooling channel 74 and the rib passage 76. The cooling air can be fed from a radially inner or radially outer location into the cooling channel 74 and rib passage 76 for radial flow through the cooling channel 74 and rib passage 76. For example, the cooling channel 74 and the rib passage 76 in the illustrated example are flow isolated from each other. As used herein, the phrase "flow isolated" or variations thereof refers to passages, channels, or both that are not fluidly connected to each other within the airfoil 60 such that air cannot flow within the airfoil 60 from one passage or channel to the other passage or channel. For instance, such flow isolation permits air in the cooling channel 74 and rib passage 76 to be used at differential pressures. In a modified example, the radial flow in the cooling channels 74 and/or rib passages 76 may turn in a platform or tip and flow in the opposite radial direction into another cooling channel 74 or rib passage 76.

In FIG. 2A, the cooling channel 74 primarily serves to cool the first side wall 62*c* and the rib passage 76 primarily serves to cool the second side wall 62*d*. For instance, the cooling channel 74 as shown generally has a T-shape, with the top leg of the "T" extending along the first side wall 62*c*. The bottom of the stem of the "T" borders the second side wall 62*d*. The cooling channel 74 is thus exposed to a larger area of the first side wall 62*c* than the second side wall 62*d* to provide more cooling to the first side wall 62*c* than to the second side wall 62*d*. On the other hand, the rib passage 76 is bound by the second side wall 62*d* but has no exposure at the first side wall 62*c* and thus serves primarily to cool the second side wall 62*d*.

With such a configuration, the cooling of the first side wall 62*c* is in essence segregated from the cooling of the second side wall 62*d*. This enables the cooling to be controlled and optimized for each side wall 62*c*/62*d*. For instance, different cooling air pressures are utilized in the cooling channels 74 versus the rib passages 76. Such pressures can be controlled, for example, by metering orifices or the like at or near the inlets of the cooling air into the cooling channels 74 and rib passages 76.

The orientation of the rib or ribs 64 provides additional cooling configurations. For instance, as shown in the airfoil 160 in FIG. 3A, the orientation of the ribs 64 are reversed from that of FIG. 2A such that the first arms 66 are attached to the second side wall 62*d* and the second and third arms 68/70 are attached to the first side wall 62*c*. For viewability, not all of the elements described for FIG. 2A are numbered in FIG. 3A. However, it is to be understood that but for the reverse orientation, the ribs 64 in FIG. 3A or in any of the figures herein have the same attributes as the ribs 64 in FIG. 2A.

In the airfoil 260 of FIG. 4A, the ribs 64 have alternating orientations. Such a configuration alters the geometry of the cooling channel such that the cooling channel 174 in airfoil 260 has a Z-shape. In this case, since the top and bottom legs of the "Z" extend along the first side wall 62*c* and the second side wall 62*d*, the cooling channel 174 provides cooling to both side walls 62*c*/62*d*. The rib passages 76 of two of the ribs 64 cool the second side 62*d*, and the rib passage 76 of the other rib 64 cools the first side wall 62*c*. The rib passages 76 thus also serve in this configuration to cool both side walls 62*c*/62*d*.

Figure 2B:
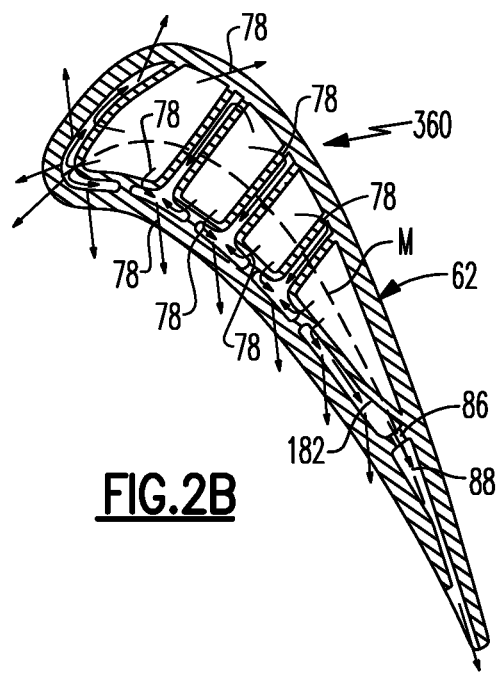
FIG. 2B illustrates the airfoil of FIG. 2A but with cooling schemes.
Figure 3B:
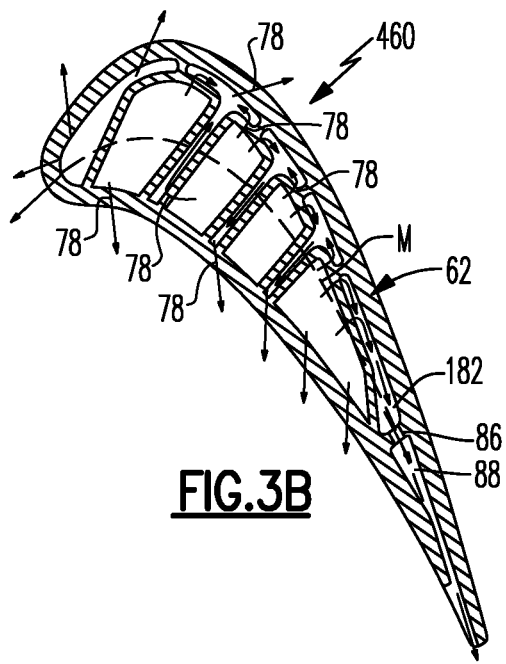
FIG. 3B illustrates the airfoil of FIG. 3A but with cooling schemes.
Figure 4B:
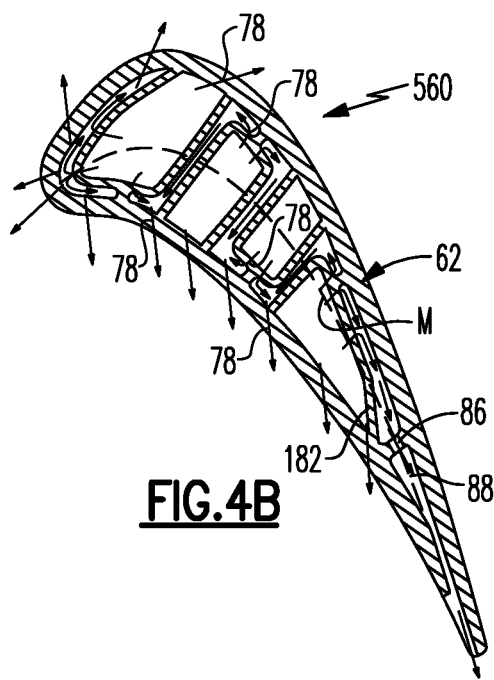
FIG. 4B illustrates the airfoil of FIG. 4A but with cooling schemes.

FIGS. 2B, 3B, and 4B illustrate further example airfoils 360/460/560 that are the same, respectively, as the airfoils 60/160/260 of FIGS. 2A, 3A, and 4A except that the airfoils 360/460/560 include cooling apertures 78. Flow arrows of the cooling air are shown and a depiction of a flow arrow that extends through a wall indicates that there is a cooling hole or aperture 78 at that location (not all of which are numbered).

The cooling apertures 78 provide additional cooling schemes to further enhance cooling. For instance, some of the cooling apertures 78 may serve as impingement holes to concentrate flow onto the inside surface of the adjacent portion of the wall 62. Other of the cooling apertures that are on the wall 62 serve as film cooling holes for the exterior surfaces of the airfoil wall 62. Other of the cooling apertures 78 that are on the long portions of the second and third arms 68/70 serve as feed holes to feed cooling air from the rib passage 76 into the cooling channel 74. Therefore, various configurations of the cooling apertures 78 can be used to control cooling air flow in the respective airfoils. In these examples, although cooling air may flow radially, the cooling apertures 78 provide for impingement cooling and axial flow of the cooling air.

Figure 5A:
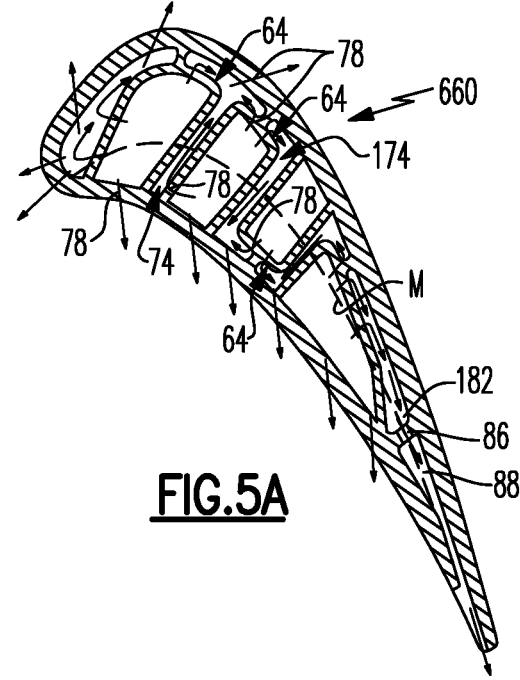
FIG. 5A illustrates another example rib configuration with cooling schemes.

FIG. 5A illustrates another example orientation of the ribs 64 and a cooling configuration. In this example, two consecutive ribs 64 are oriented the same and the third rib 64 has the reverse orientation. This provides a T-shaped cooling channel 74 and a Z-shaped cooling channel 174. Such a configuration may be used to provide more cooling to an area of one of the side walls 62*c* or 62*d* using the top of the "T" of the cooling channel 74, while providing cooling to both side walls 62*c*/62*d* at other areas using the Z-shape of the cooling channel 174. As in prior examples, the airfoil 660 may also include cooling apertures 78, although in a further example the cooling apertures 78 are excluded for a radial flow scheme.

Figure 5B:
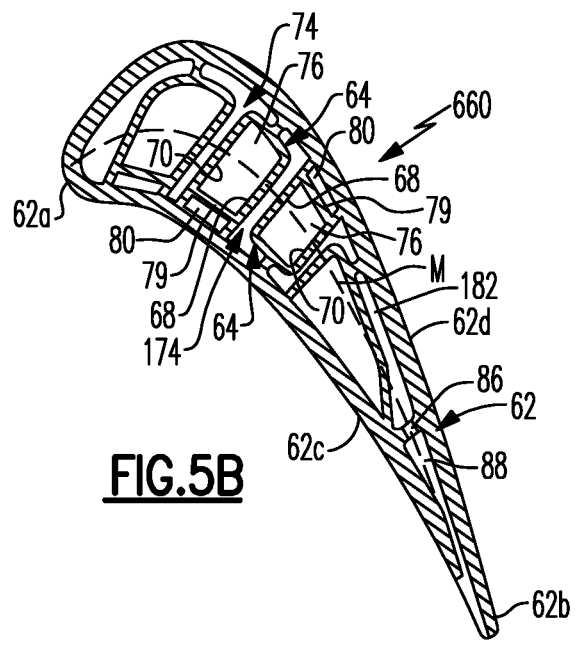
FIG. 5B illustrates a variation of the airfoil of FIG. 5A.

FIG. 5B illustrates a variation of the airfoil 660. In the variation, the airfoil 660 includes a cross arm 79 connecting the second and third arms 68/70. The cross arm 79 partitions the rib passage 76 to create an additional cooling passage 80 along either the first side wall 62*c* or the second side wall 62*d*. The cooling passage 80 is aligned with the rib 64 in that the cooling passage 80 is between the second and third arms 68/70. The rib passages 76 thus do not border a hot wall. As a result, there is a reduced need or no need for cooling air in the rib passages 76. However, the segregation of cooling air is maintained in that the cooling passages 80 can be fed separately from the cooling channels 74/174. In such a cooling scheme, the rib passages 76 in essence become space-eaters that reduce cooling flow area inside the airfoil 760/860.

The cooling passages 80 may be minicores or minicore passages. A "minicore" or "minicore passage" is a reference to the small investment casting core that is typically used to make an embedded cooling passage, as opposed to a main core that is used to form a main or central core cavity in an airfoil. Such minicore passages are typically high aspect ratio passages that are much thinner than passages in the central portion of the airfoil. The cooling passages 80 are fed cooling air radially, separately from the rib passages 76 and cooling channels 74/174 but alternatively or additionally are fed from the cooling channels 74/174 and/or rib passages 76

Figure 2C:
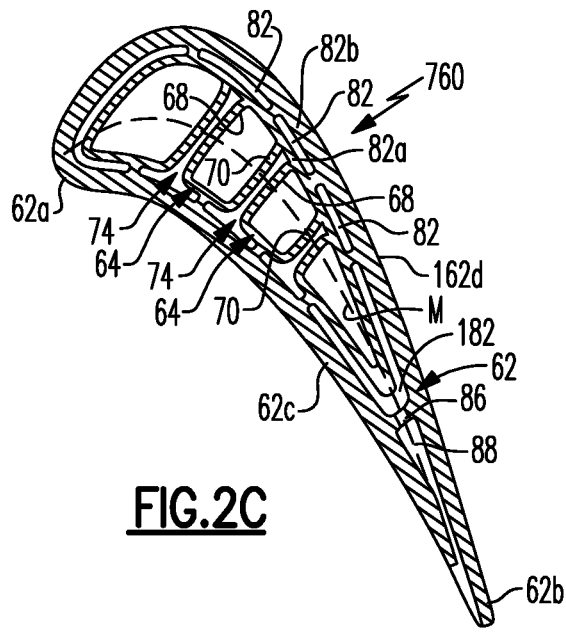
FIG. 2C illustrates the airfoil of FIG. 2A but with an embedded cooling passage in the second side wall of the airfoil wall.
Figure 3C:
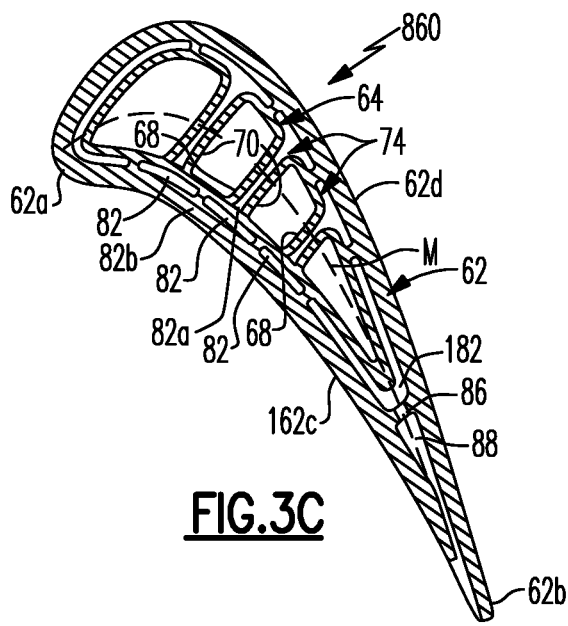
FIG. 3C illustrates the airfoil of FIG. 3A but with an embedded cooling passage in the second side wall of the airfoil wall.

FIGS. 2C and 3C illustrate, respectively, further example airfoils 760 and 860. The airfoils 760/860 are the same, respectively, as airfoils 60/160 except that the side wall 162*c* (FIG. 2C) and the side wall 162*d* (FIG. 3C) include a cooling passage 82 embedded therein. For example, each side wall 162*c*/162*d* includes an inner portion 82*a* and an outer portion 82*b* between which the cooling passage 82 is embedded. The cooling passages 82 may also be high aspect ratio minicore or minicore passages, as discussed above. In these examples, the cooling passages 82 are offset from the ribs 64 in that portions of the cooling passages 82 are not between the second and third arms 68/70. The cooling passages 82 are fed cooling air radially, separately from the rib passages 76 and cooling channels 74/174 but alternatively or additionally are fed from the cooling channels 74/174 and/or rib passages 76.

The cooling passages 82 cool the respective side walls 162*c*/162*d* such that the rib passages 76 do not border a hot wall. As a result, there is a reduced need or no need for cooling air in the rib passages 76. However, the segregation of cooling air is maintained in that the cooling passages 82 can be fed separately from the cooling channels 74/174. In such a cooling scheme, the rib passages 76 in essence become space-eaters that reduce cooling flow area inside the airfoil 760/860.

As also demonstrated in the examples herein, the airfoils may also include a cooling passage 182 toward the trailing end 62b. Like the cooling passages 82, the cooling passages 182 are high aspect ratio minicore passages. As shown in FIGS. 2C and 3C, the cooling passages 182 are generally V-shaped, with one leg of the "V" on the pressure side and the other leg on the suction side. The cooling passages 182 may include cooling apertures as discussed above for discharging cooling air to the exterior of the airfoil, however, in the examples shown the cooling passages 182 at least have an internal aperture 86 that directly connects the cooling passage 182 to a trailing end passage 88. Thus, rather than being dumped overboard to the pressure or suction side, at least a portion of the cooling air in the cooling passages 182 is fed into the trailing end passage 88 for discharge from the trailing end 62b. In other examples, as shown in FIGS. 3A, 3B, 4A, 4B, 5A, and 5B, the cooling passage 182 is exclusively on the suction side, while in FIGS. 2A and 2B the cooling passages 182 is exclusively on the pressure side. As will be appreciated, the cooling passages 182 are used as shown in combination with the ribs and rib passages described herein but may alternatively be used in other configurations that do not have such ribs and rib passages.

As will be appreciated from the examples herein, various cooling configurations are available via the ribs 64. Furthermore, such configurations facilitate segregating cooling air flow used to cool the pressure side from cooling air flow used to cool the suction side. As a result, cooling air flows to the pressure and suction sides can be optimized, thereby facilitating a reduction in the use of cooling air and increase in efficiency.

Figure 6A:
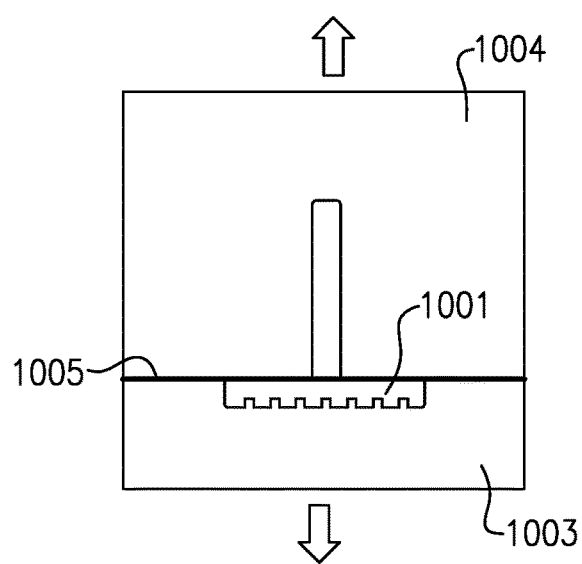
FIG. 6A illustrates a method for fabricating a T-shape core for investment casting.
Figure 6B:
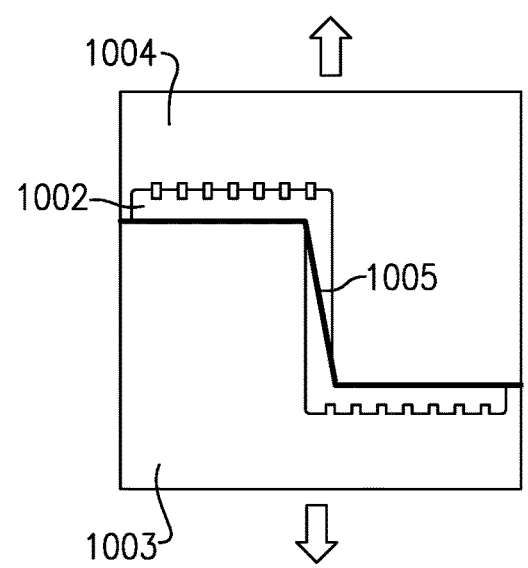
FIG. 6B illustrates a method for fabricating a Z-shape core for investment casting.

The airfoils described herein may be fabricated from superalloys using such processes as investment casting or additive manufacturing. For example, in an investment casting process, one or more investment cores are fabricated and then used in the casting of the superalloy to define internal features in the airfoil. Depending on the geometry of the investment core, it may be formed from a ceramic or other suitable material in a molding process. The molding process involves injecting the material into the cavity of a molding die to form the shape of the core. In particular, for single pull direction molding in which two molding die halves are closed and opened along a single axial direction, there must be a suitable parting line along the molded component which allows the die halves to open without destroying the molded component and/or equipment. In other words, if the cavity were designed such that the molded component interlocked with the cavity in one or both die halves, the dies would not open, would destroy the molded component when opened, and/or would damage the equipment. In this regard, the geometry of the cores required to form the channels 74/174 described herein also facilitates core molding in that the geometries have suitable parting lines for injection molding. For instance, the channels 74/174 herein have the T-shape or Z-shape such that the respective corresponding T- and Z-shaped cores can be injection molded in a die having a single pull direction. FIGS. 6A and 6B illustrate, respectively, a T-shape core 1001 and a Z-shaped core 1002. The molding die halves are indicated at 1003 and 1004 and form parting lines 1005 along the cores 1001/1002. Although shown schematically, it is to be understood that the cores 1001/1002 have the geometric attributes of the channels 74/174 shown and described herein so as to form the ribs as shown and described. Moreover, the cores and channels herein also exemplify a method of fabricating the airfoil in an investment casting process by using the core or cores to form the disclosed airfoils.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil wall defining a leading end, a trailing end, a first side wall, and a second side wall; and
a rib connecting the first and second side walls of the airfoil wall, the rib including a first arm by which the rib is solely connected to the first side wall, and second and third arms by which the rib is solely connected to the second side wall, the second and third arms defining shoulders such that a portion of the rib formed by the second and third arms is U-shaped.

2. The airfoil as recited in claim 1, wherein the first arm, the second arm, and the third arm each include a first end and a second end, and the rib includes the first end of the first arm attached to the first side wall, the second end of the first arm attached at a node to the respective first ends of the second and third arms, and the second ends of the second and third arms are attached to the second side wall.

3. The airfoil as recited in claim 2, wherein the node is closer to the first side wall than to the second side wall.

4. The airfoil as recited in claim 1, wherein the first side wall is a pressure side wall and the second side wall is a suction side wall.

5. The airfoil as recited in claim 1, wherein the second and third arms and the second side wall bound a rib passage.

6. The airfoil as recited in claim 1, wherein the first, second, and third arms include cooling apertures.

7. The airfoil as recited in claim 1, wherein the second side wall includes a cooling passage embedded between inner and outer portions of the second side wall.

8. The airfoil as recited in claim 7, wherein the second and third arms and the second side wall bound a rib passage, and the cooling passage is offset from the rib passage.

9. The airfoil as recited in claim 1, further comprising a cross arm connecting the second and third arms.

10. An investment casting core having a T-shape or a Z-shape configured to form the rib as recited in claim 1.

11. The airfoil as recited in claim 1, wherein each of the shoulders includes a corner.

12. An airfoil comprising:
an airfoil wall defining a leading end, a trailing end, a first side wall, and a second side wall; and first and second ribs each connecting the first and second side walls of the airfoil wall, each of the first and second ribs including
- a first arm by which the respective first or second rib is solely joined to one of the first or second side walls, and
- second and third arms by which the respective first or second rib is solely connected to the other of the first or second side wall,
- wherein the first and second ribs have one of the following configurations:
  - (i) the first arm of the first rib is connected to the first side wall and the second and third arms of the first rib are connected to the second side wall, and the first arm of the second rib is connected to the second side wall and the second and third arms of the second rib are connected to the first side wall, the first and second ribs defining a Z-shaped cooling channel there between, or
  - (ii) the first arm of the first rib is connected to the first side wall and the second and third arms of the first rib are connected to the second side wall, and the first arm of the second rib is connected to the first side wall and the second and third arms of the second rib are connected to the second side wall, the first and second ribs defining a T-shaped cooling channel there between.

13. The airfoil as recited in claim 12, wherein the first arm, the second arm, and the third arm each include a first end and a second end, and the first and second ribs include the first end of the first arm attached to the first or second side wall, the second end of the first arm attached at a node to the respective first ends of the second and third arms, and the second ends of the second and third arms are attached to the other of the first or second side wall.

14. The airfoil as recited in claim 12, wherein the first and second ribs and the first and second side walls bound a cooling passage there between.

15. The airfoil as recited in claim 12, wherein at least one of the first or second side walls includes a cooling passage embedded between inner and outer portions of the one of the first or second side walls.

16. The airfoil as recited in claim 15, wherein the second and third arms of the first rib and the second side wall bound a rib passage, and the cooling passage is axially offset from the rib passage.

17. The airfoil as recited in claim 15, wherein the airfoil wall includes a trailing end passage and an internal aperture connecting the cooling passage to the trailing end passage.

18. The airfoil as recited in claim 12, wherein the second and third arms of the respective first and second ribs define shoulders that form a U-shape.

19. The airfoil as recited in claim 12, wherein the first and second ribs have configuration (i).

20. The airfoil as recited in claim 12, wherein the first and second ribs have configuration (ii).

21. A gas turbine engine comprising:
- a compressor section;
- a combustor in fluid communication with the compressor section; and
- a turbine section in fluid communication with the combustor,
- the turbine section having an airfoil that includes
  - an airfoil wall defining a leading end, a trailing end, a first side wall, and a second side wall, and
  - first and second ribs each connecting the first and second side walls of the airfoil wall, each of the first and second ribs including
    - a first arm by which the respective first or second rib is solely joined to one of the first or second side walls, and
    - second and third arms by which the respective first or second rib is solely connected to the other of the first or second side wall, the second and third arms defining shoulders such that a portion of the rib formed by the second and third arms is U-shaped.

22. The gas turbine engine as recited in claim 21, wherein, for each of the first and second ribs, the first arm, the second arm, and the third arm each include a first end and a second end, and the rib includes the first end of the first arm attached to the first side wall, the second end of the first arm attached at a node to the respective first ends of the second and third arms, the second ends of the second and third arms are attached to the second side wall, and the node is closer to the first side wall than to the second side wall.

* * * * *